(12) United States Patent
Arnold

(10) Patent No.: US 7,913,584 B2
(45) Date of Patent: Mar. 29, 2011

(54) SUPPORT ARM FOR A CLAMPING AND CENTERING ELEMENT OF A GRIPPER FRAME FOR HOLDING THREE-DIMENSIONAL COMPONENTS IN THE MOTOR VEHICLE INDUSTRY

(75) Inventor: Roland Arnold, Waldburg (DE)

(73) Assignee: ThyssenKrupp Drauz Nothelfer GmbH, Heilbronn (DE)

( * ) Notice: Subject to any disclaimer, the term of this patent is extended or adjusted under 35 U.S.C. 154(b) by 129 days.

(21) Appl. No.: 12/095,247

(22) PCT Filed: Nov. 20, 2006

(86) PCT No.: PCT/EP2006/068679
§ 371 (c)(1),
(2), (4) Date: Oct. 30, 2008

(87) PCT Pub. No.: WO2007/063006
PCT Pub. Date: Jun. 7, 2007

(65) Prior Publication Data
US 2009/0084217 A1   Apr. 2, 2009

(30) Foreign Application Priority Data

Nov. 29, 2005 (DE) .......................... 10 2005 056 811
Nov. 29, 2005 (DE) .......................... 10 2005 063 357

(51) Int. Cl.
*B25J 17/00* (2006.01)
(52) U.S. Cl. .................... 74/490.06; 74/490.05; 901/28; 901/29; 414/729

(58) Field of Classification Search .................. 414/729; 74/490.05, 490.06; 901/28, 29; 403/31, 403/38, 39
See application file for complete search history.

(56) References Cited

U.S. PATENT DOCUMENTS

| | | | |
|---|---|---|---|
| 3,638,973 A | 2/1972 | Poletti | 285/184 |
| 4,974,802 A | 12/1990 | Hendron | 248/181 |
| 5,544,968 A * | 8/1996 | Goellner | 403/31 |
| 6,379,073 B1 | 4/2002 | Yoo et al. | 403/90 |
| 6,641,323 B2 | 11/2003 | Ronsheim | 403/90 |
| 6,722,842 B1 * | 4/2004 | Sawdon et al. | 414/729 |
| 2002/0000503 A1 | 1/2002 | Fidler | 248/288.51 |

FOREIGN PATENT DOCUMENTS

| | | |
|---|---|---|
| DE | 38 41 744 A1 | 7/1989 |
| DE | 93 07482 | 10/1993 |
| EP | 1 607 638 | 12/2005 |
| WO | 01/75318 | 10/2001 |

* cited by examiner

Primary Examiner — Donald Underwood
(74) Attorney, Agent, or Firm — Proskauer Rose LLP

(57) ABSTRACT

A support arm for a clamping and/or centering element of a gripper frame for holding three-dimensional components includes an adjustment mechanism, such as a ball that can pivot or a cylindrical pin that slide and rotate, held in a clamping and release unit with clamping jaws that can be radially clamped and are configured as shells engaging on opposing halves of the ball or the cylindrical pin and whose separation distance can be set by a means of adjustment. A radially directed compression force can be applied to the clamping jaws by a ring-shaped hydraulic force generator that is arranged about the jaws.

2 Claims, 4 Drawing Sheets

Figure 1:
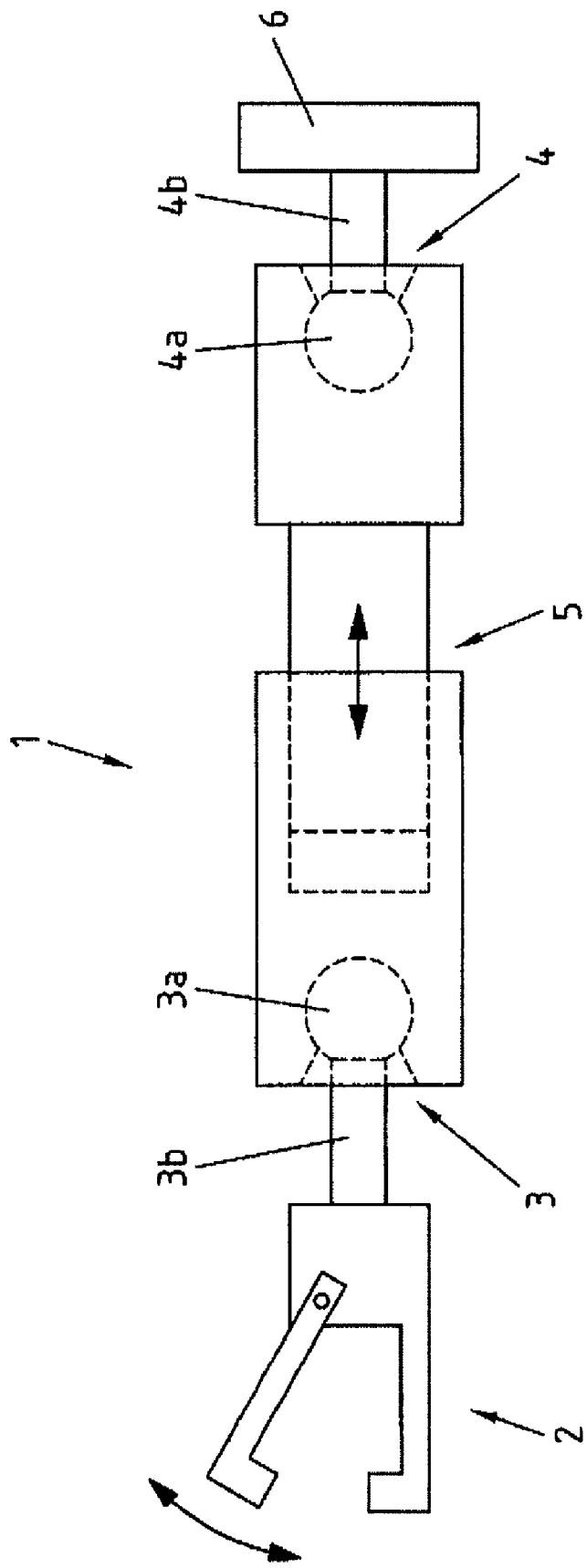

SUPPORT ARM FOR A CLAMPING AND CENTERING ELEMENT OF A GRIPPER FRAME FOR HOLDING THREE-DIMENSIONAL COMPONENTS IN THE MOTOR VEHICLE INDUSTRY

CROSS-REFERENCE TO RELATED APPLICATIONS

This application is a National Phase Application of International Application No. PCT/EP2006/068679, filed on Nov. 20, 2006, which claims the benefit of and priority to German patent application no. DE 10 2005 056 811.4, filed Nov. 29, 2005, and German patent application no. DE 10 2005 063 357.9, filed Nov. 29, 2005. The disclosure of each of the above applications is incorporated herein by reference in their entirety.

FIELD OF THE INVENTION

The invention relates to a support arm for a clamping and/or centering element of a gripper frame for holding three-dimensional components, in particular in the motor vehicle industry, in which an adjustment mechanism is integrated, with at least one ball that can pivot and/or a cylindrical pin that can slide and rotate, in either case held in a clamping and release unit, wherein the clamping and release unit encompasses the ball and/or the cylindrical pin with clamping jaws that can be radially clamped.

BACKGROUND

Gripper frames of known art for holding three-dimensional components in the manufacture of motor vehicle bodywork (U.S. Pat. No. 6,722,842 B1) have clamps and centering pins that enable a three-dimensional component to be held in the correct position. Such gripper frames can be moved with handling robots in space, wherein a three-dimensional component held by a gripper frame can be transported to the location, and held here in the correct position, where it is to be attached to a motor vehicle body and/or connected with other bodywork components. Since for the bodywork of a vehicle several three-dimensional components are to be manipulated, it is of known art to adapt the gripper frame with regard to its clamping and centering elements held by support arms to the geometry of the component to be manipulated in each case. For this purpose an adjustment mechanism is integrated in each support arm, which in a clamping and release unit includes at least one ball and one cylindrical pin, which enable pivoting, sliding and rotation of the clamping and centering elements held by the support arm. In general, the clamping and release unit for both the ball and also the cylindrical pin consists essentially of clamping shells or clamping jaws that can be clamped up using clamping bolts. Accordingly this requires time-consuming manual work to adjust the gripper frame to the geometry of a new component with respect to its clamping and centering elements.

SUMMARY OF THE INVENTION

The object of the present invention is to create a support arm for a clamping and/or centering element of a gripper frame for holding three-dimensional components of the kind cited in the background, which also enables the adjustment of a gripper frame in a simple manner to different geometries of three-dimensional components.

This object is achieved according to the invention with a support arm of the kind cited in the background, in that the clamping jaws are configured as shells engaging on opposing halves of the ball or of the cylindrical pin and in the region of the mutually opposing vertices of the ball or cylindrical pin, whose separation distance can be set by a means of adjustment, wherein a radially directed compression force can be applied to the clamping jaws by a ring-shaped hydraulic force generator that is arranged about them.

With a gripper frame fitted with the support arm according to the invention, in the event of an exchange from one three-dimensional component to a three-dimensional component with another geometry, the adjustment of clamping and/or centering elements held by support arms can easily be undertaken without time-consuming fitting tasks, such as the release of screw bolts on clamping shells, clamping jaws and similar, in that the clamping jaws are firstly released by the hydraulic force generator. The clamping and centering elements can then be moved into the required position, where they are fixed by means of renewed application of pressure by the force generator. In the case of a ball the released clamping jaws enable not only a rotation, but also a pivoting about its centre, while in the case of a cylindrical pin the clamping jaws enable the rotation of the cylindrical pin about its axis, but also its movement in an axial direction. By clamping jaws are to be understood not only segments, but also rings and slitted sleeves. Which particular embodiment the clamping jaws can have depends essentially on the "ball" or "pin" component to be clamped.

According to one embodiment of the invention the hydraulic pressure is applied by a force generator integrated in the support arm. In an embodiment which includes a plurality of adjustment mechanisms with hydraulic force generators all force generators are preferably supplied from the same pressure generator.

DETAILED DESCRIPTION OF THE DRAWINGS

Figure 2:
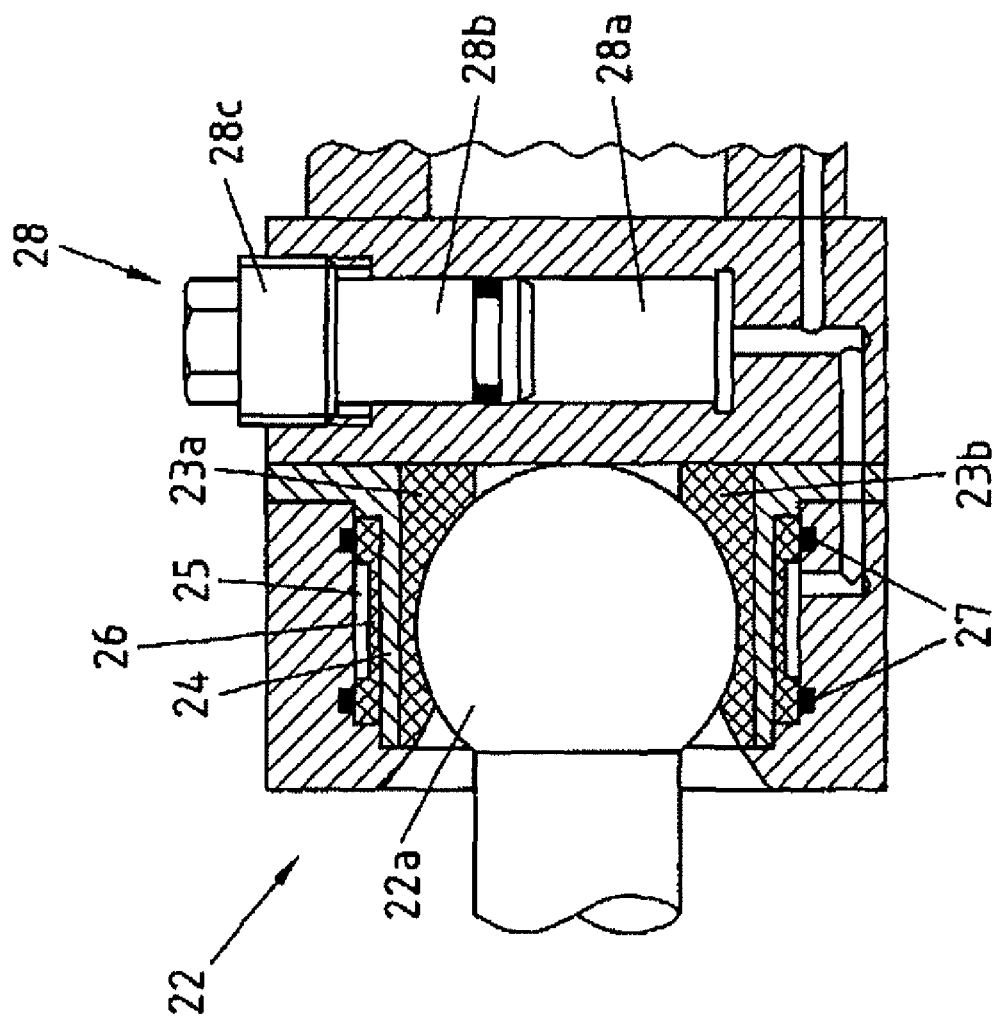
Figure 3:
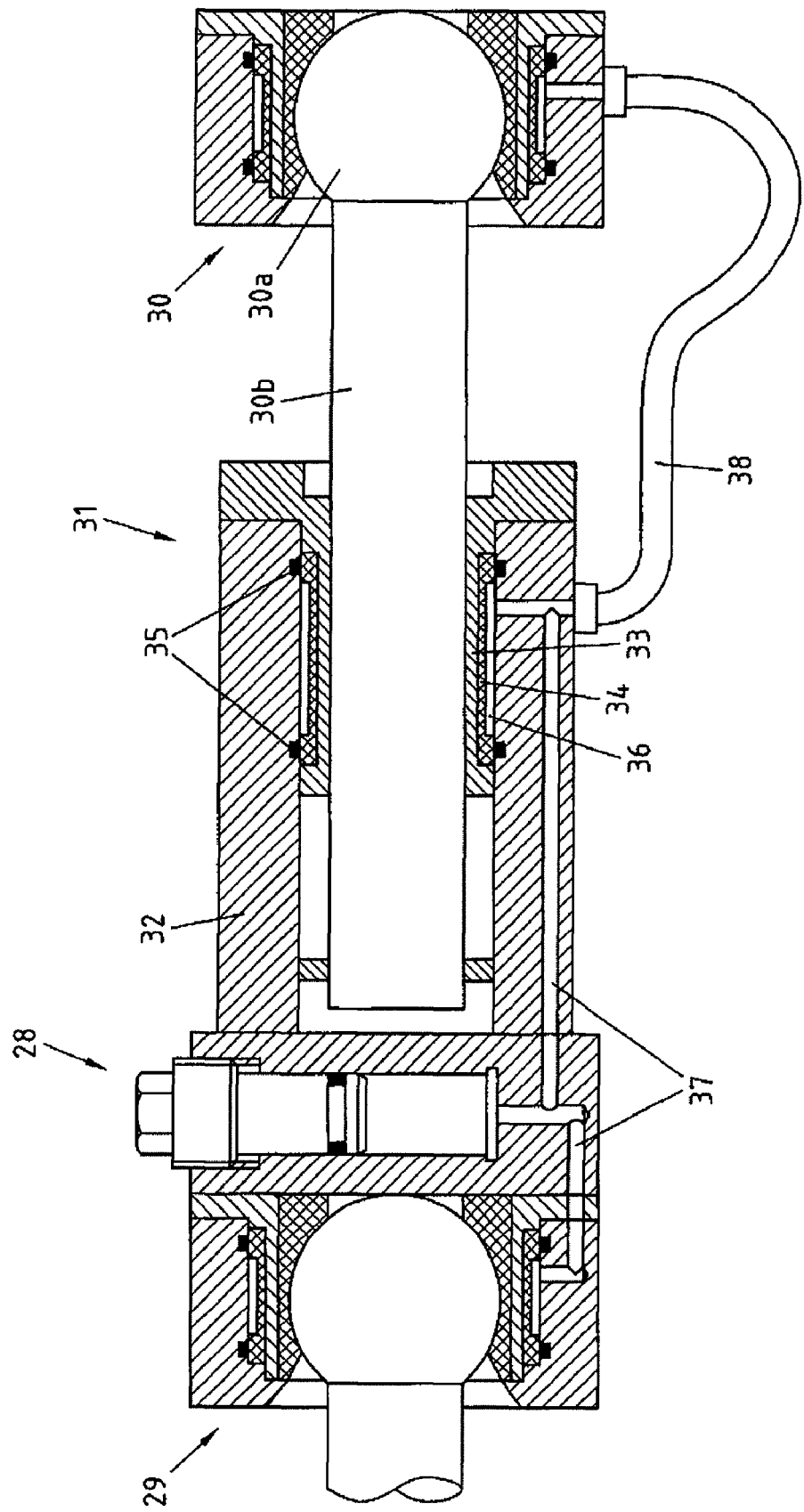
Figure 4:
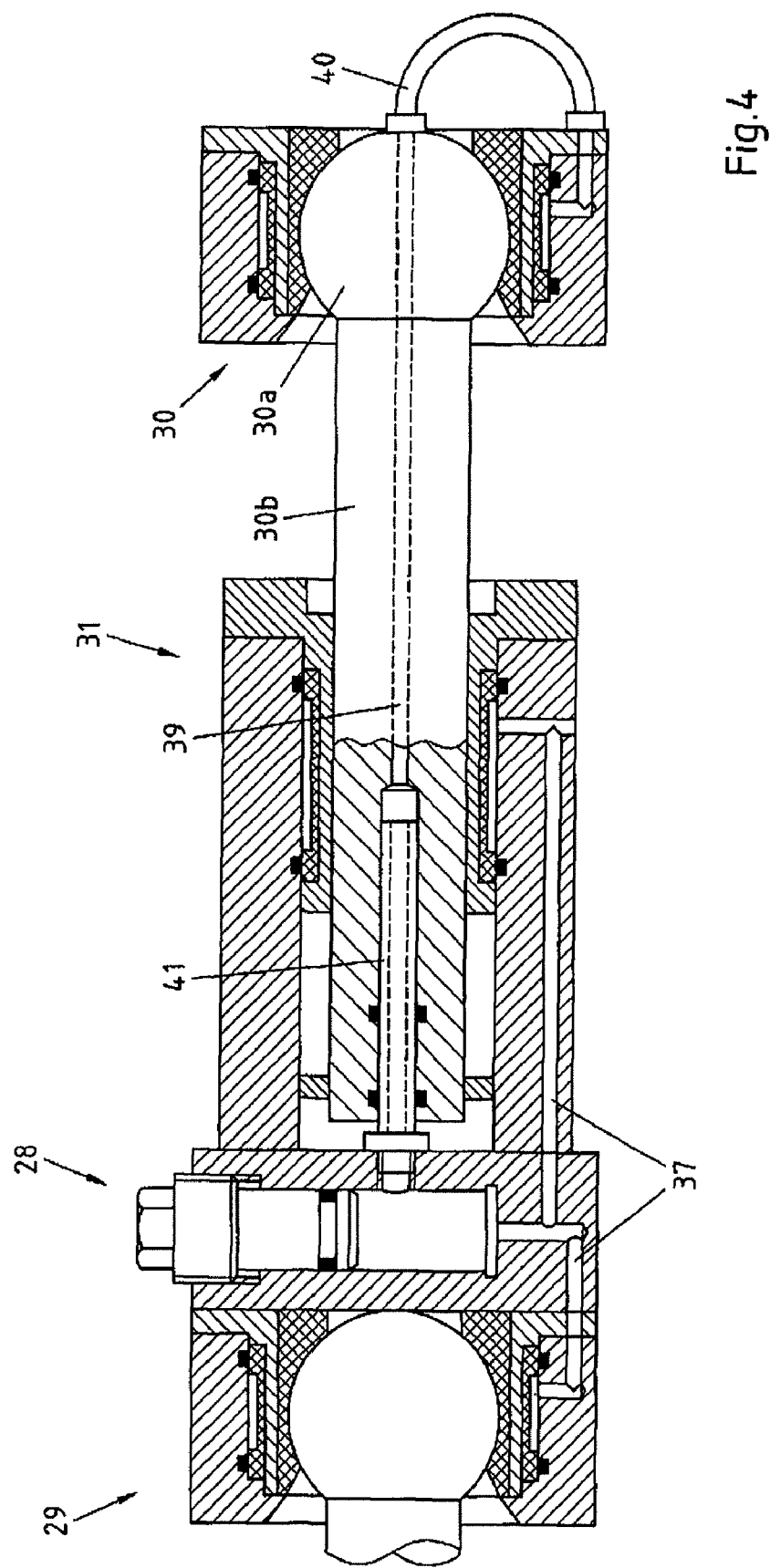

In what follows the invention is elucidated in more detail by means of a drawing representing various examples of embodiment. In the individual figures:

FIG. 1 shows in a schematic representation a side view of a support arm for a clamping element with two ball joints and a longitudinal extension, FIG. 2 shows an axial section of a mechanical clamping and release unit of a ball joint, FIG. 3 an axial section of a support arm that in principle matches up to the embodiment in FIG. 1 with two ball joints and a longitudinal extension using clamping and release units from the example of embodiment in FIG. 2, and FIG. 4 shows an axial section of the support arm in FIG. 3 in a slightly modified embodiment.

The support arm 1 represented in FIG. 1 for a clamping element 2 includes two ball joint connections 3, 4 and a longitudinal extension 5 arranged between them. The clamping element 2 is carried by a pin 3b formed onto the ball 3a of the ball joint 3. A pin 4b formed onto the ball 4a of the ball joint 4 carries an attachment flange 6, with which the support arm 1 can be attached to a bracket, not represented, of a gripper frame. Clamping and release units, that have yet to be described in detail, are assigned to the ball joints 3, 4 and to the longitudinal extension 5; these units make it possible, when a clamping and release unit is released, for the clamping element 2 to be moved relative to the attachment flange 6 from one position in space to another position in space and here fixed. In this process the ball joints 3, 4 allow both rotational and pivoting movements.

In an embodiment shown in FIG. 2, a clamping and release unit is assigned to the ball joint 22; by means of this unit the ball 22a in the region of its maximum diameter is surrounded by a plurality of clamping jaws 23a, 23b that are fixed rotationally and axially, but can move radially, and are configured as calotte-shaped segments. The clamping jaws 23a, 23b are surrounded by a flexible annular sleeve 24 that is axially slitted, at least in the central region of the ball 22a. A pressure compartment 25 surrounding the annular sleeve 24 is sealed off radially on the side of the annular sleeve 24 by a closed elastic sleeve 26 and axially by O-ring seals 27. A pressurized fluid from a pressure generator 28 can be applied to the pressure compartment 25. The pressure generator 28 consists of a cylindrical cavity 28a and an adjusting piston 28b, which is supported on a screw 28c. By screwing in the screw 28c pressure is built up, and by screwing out the screw 28c pressure is relieved. Thus the clamping and release unit is fixed in place in the first instance, and in the second instance it is released.

In an embodiment of an arm with two ball joints 29, 30 and one longitudinal extension 31 (as shown in FIG. 3) the clamping and release units of the ball joints 29, 30 have the same structure as in the example of embodiment in FIG. 2, while the clamping and release unit of the longitudinal extension 31 only has the same structure in principle as that of the ball joint 22 in FIG. 2. The difference in the case of the longitudinal extension 31 consists on the one hand in the spatial shape and on the other hand in the aggregation of clamping jaws and surrounding sleeve into one component. Thus the cylindrical pin 30b is surrounded by a clamping jaw 33, that is designed as an elastic and at least partially axially slitted clamping sleeve that is held fixed axially and rotationally in the housing 32. Pressure can be applied radially to this clamping jaw/clamping sleeve 32 via a flexible sleeve 34. This pressure can be built up hydraulically in an annular compartment 36 that is sealed off from the sleeve 34 and laterally by O-ring seals 35. The hydraulic pressure is supplied from the common pressure generator 28, already described, via a system of lines 37, 38 to the annular compartment 36 and the other annular compartments.

Thus as it would be possible to aggregate the clamping jaws and the sleeve of the ball joints 29, 30 into one component, vice versa it would also be possible to embody the clamping sleeve 33 on the longitudinal extension 31 in two parts.

The embodiment illustrated in FIG. 4 corresponds in principle to that of FIG. 3. The single difference consists in that in place of the outer line 38 of the example of embodiment in FIG. 3 an integrated line 39 and an outer loop line 40 are provided. The integrated line 39 passes through the axially moveable cylindrical pin 30b and an axially fixed tubular channel 41 that telescopically slides into this cylindrical pin 30b.

The invention claimed is:

1. A support arm for a clamping and/or centering element of a gripper frame for holding three-dimensional components, in which an adjustment mechanism is integrated, with at least one ball that can pivot and/or a cylindrical pin that can slide and rotate, in either case held in a clamping and release unit, wherein the clamping and release unit encompasses the at least one ball and/or the cylindrical pin with clamping jaws that can be radially clamped, wherein a radially directed compression force can be applied to the clamping jaws by a ring-shaped hydraulic force generator that is arranged about the clamping jaws, the clamping jaws are configured as shells engaging on opposing halves of the at least one ball or of the cylindrical pin and in a region of mutually opposing vertices of the at least one ball or cylindrical pin, whose separation distance can be set by a means of adjustment, wherein hydraulic pressure for the ring-shaped hydraulic force generator is applied by a pressure generator integrated in the support arm.

2. The support arm according to claim 1, wherein a plurality of adjustment mechanisms with hydraulic force generators is provided, and wherein all force generators are supplied from the same pressure generator.

* * * * *